United States Patent
Wood

(10) Patent No.: US 6,172,676 B1
(45) Date of Patent: Jan. 9, 2001

(54) METHOD AND COMPUTER PROGRAM PRODUCT FOR IMPLEMENTING MULTIPLE DRAG AND DROP OPERATIONS FOR LARGE OBJECTS WITHOUT BLOCKING AN OPERATING SYSTEM INTERFACE

(75) Inventor: Brian Owen Wood, Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/118,594

(22) Filed: Jul. 17, 1998

(51) Int. Cl.[7] ....................................... G06F 13/00
(52) U.S. Cl. ........................... 345/346; 345/333; 345/339
(58) Field of Search ................................ 345/339, 333, 345/346–351

(56) References Cited

U.S. PATENT DOCUMENTS 5,724,532 * 3/1998 Thomson .............................. 345/346
5,852,441 * 12/1998 Nakajima et al. .................... 345/352
5,933,825 * 8/1999 McClaughry et al. .................... 707/8

OTHER PUBLICATIONS

Apple computer: Apple Picks Up the Tempo ; MacUser, pp. 1–4, Aug. 1997.*

* cited by examiner

Primary Examiner—Raymond J. Bayerl
Assistant Examiner—Tadesse Hailu
(74) Attorney, Agent, or Firm—Joan Pennington

(57) ABSTRACT

A method and a shell extension computer program product for implementing drag and drop operations for large objects without blocking an operating system interface of the computer system. Monitoring for a drop operation by an application is performed by an operating system interface shell. Responsive to an identified drop operation, a transfer structure is sent to the application by the shell extension program. The transfer structure includes a destination directory. Responsive to the application receiving the transfer structure, the data object is transferred to the destination directory and the operating system interface shell is bypassed during the data object transfer.

10 Claims, 8 Drawing Sheets

METHOD AND COMPUTER PROGRAM PRODUCT FOR IMPLEMENTING MULTIPLE DRAG AND DROP OPERATIONS FOR LARGE OBJECTS WITHOUT BLOCKING AN OPERATING SYSTEM INTERFACE

FIELD OF THE INVENTION

The present invention relates to the data processing field, and more particularly, relates to a method and computer program product for simultaneous drag and drop operations for large objects without blocking an operating system interface of the computer system.

DESCRIPTION OF THE RELATED ART

In graphical environments, a common function to enhance usability is dragging and dropping of files. The user may want to drag an object out of a program and drop it onto the operating system's shell. In the case of Microsoft Windows, this would mean the desktop and explorer. When dropping large amounts of data to the operating system interface shell, the documented method is to use a technique called delayed rendering. This technique calls for providing just the filenames to the operating system interface shell during the drag. When the drop takes place, the operating system interface shell calls back to the application to get the actual data. The operating system interface shell creates the dropped files from the data it receives from the application. The problem arises when it takes a considerable amount of time to generate or transfer this data. During that time, the operating system interface shell is unresponsive to the user because it is busy waiting for the data from the application. When the target of the drop is the desktop, the user cannot work with icons on the desktop, drop other items from our application onto the desktop, use the start menu, or switch between programs with the taskbar while the data is being transferred.

A need exists for a method and computer program product for implementing drag and drop operations for large objects without blocking an operating system interface of the computer system.

SUMMARY OF THE INVENTION

A principal object of the present invention is to provide an improved method and computer program product for implementing drag and drop operations for large objects without blocking an operating system interface of the computer system. Other important objects of the present invention are to provide such improved method and computer program product substantially without negative effects and that overcome many disadvantages of prior art arrangements.

In brief, a method and computer program product for implementing drag and drop operations for large objects without blocking an operating system interface of the computer system. Monitoring for a drop operation by an application is performed by an operating system interface shell. Responsive to an identified drop operation, a transfer structure is sent to the application. The transfer structure includes a destination directory. Responsive to the application receiving the transfer structure, the data object is transferred to the destination directory and the operating system interface shell is bypassed during the data object transfer.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
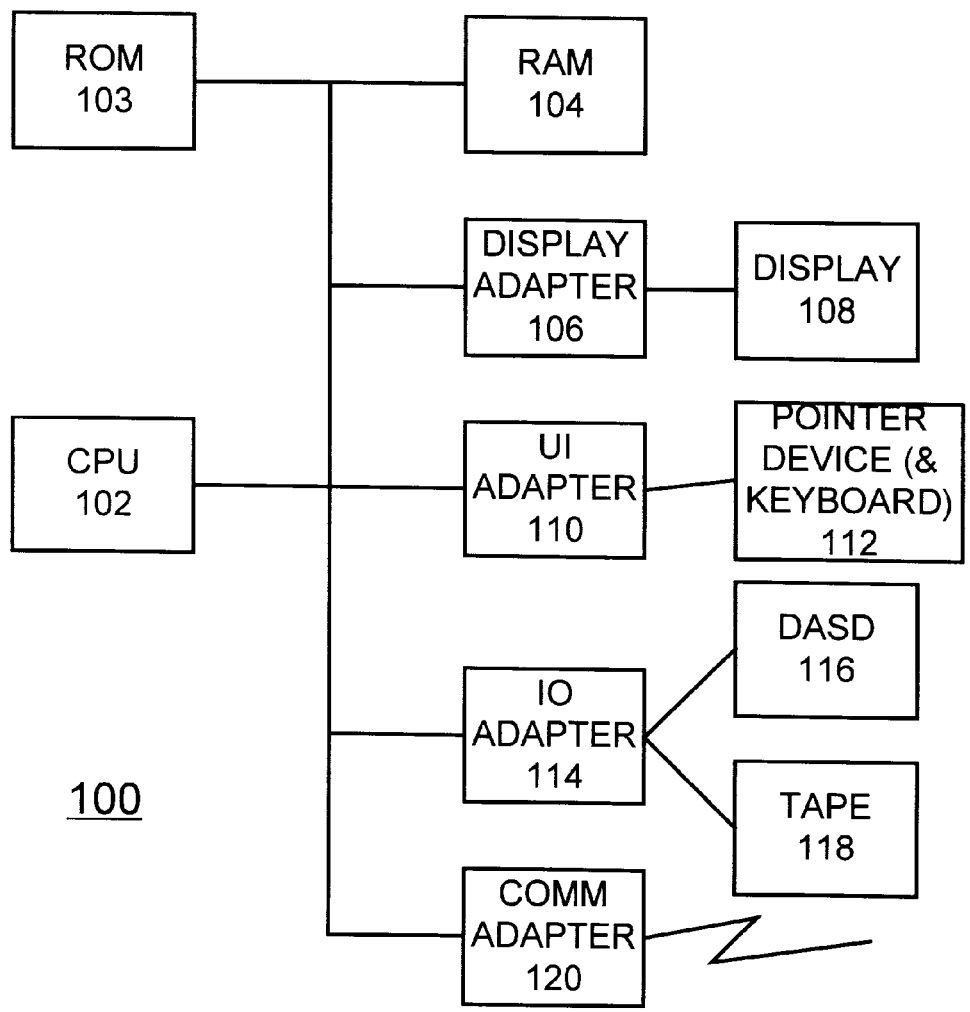
FIG. 1 is a block diagram representation illustrating a computer system for implementing methods for simultaneous drag and drop operations for large objects without blocking an operating system interface of the computer system in accordance with the preferred embodiment.
Figure 2:
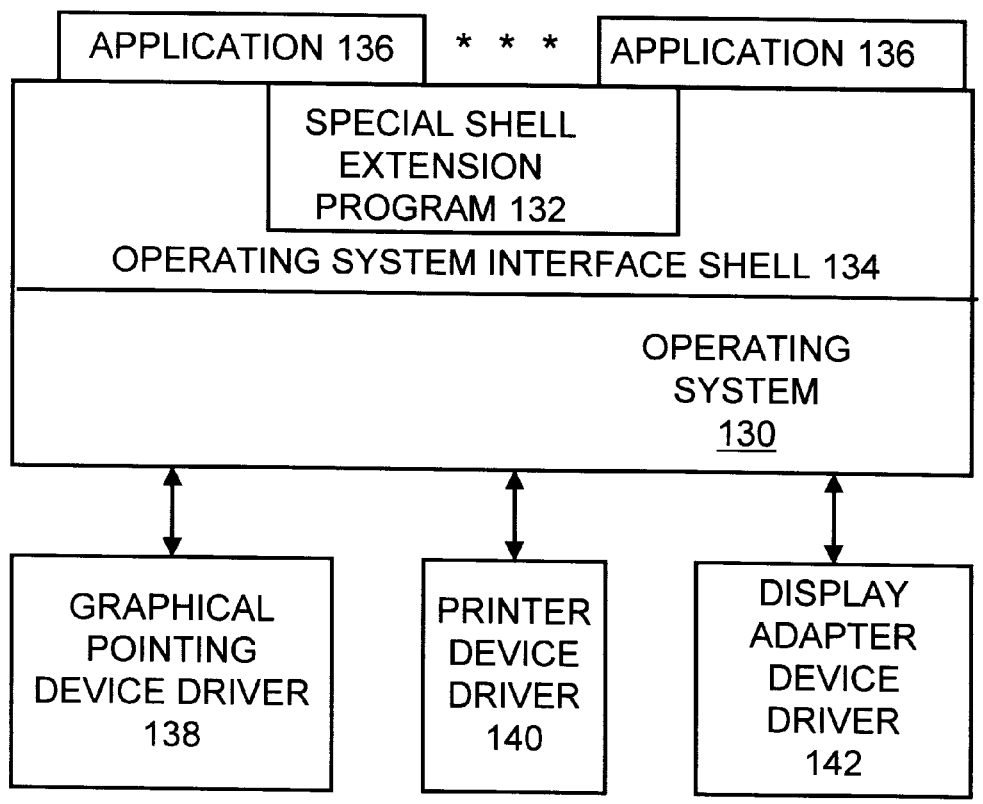
FIG. 2 is a block diagram representation illustrating an operation system of the computer system of FIG. 1 of the preferred embodiment.

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function.

As shown in FIG. 2, computer system 100 includes an operating system 130, a special shell extension program 132 of the preferred embodiment and an operating system interface shell 134. Multiple applications 136 and multiple device drivers including a graphical pointing device driver 138, a printer device driver 140, and a display adapter device driver 142 are supported by the operating system 130.

Various commercially available processors could be used for computer system 100, for example, an IBM personal computer or similar workstation can be used. Central processor unit 102 is suitably programmed to execute the flowcharts of FIGS. 3A and 3B, 4, and 5 of the preferred embodiment.

In accordance with features of the preferred embodiment, the special shell extension program 132 attaches to the operating system interface shell 134 and monitors all drop activity in the operating system interface shell 134. An application 136 starts the drag and drop operation as it normally would. When the special shell extension program 132 notices a drop from an application 136, the special shell extension program 132 sends a message back to the application with a destination directory of the drop. The operating system interface shell 134 then requests the data from the application like usual, but since where the drop took place is known, the data is written directly to the destination or target directory, bypassing the operating system interface shell 134. The operating system interface shell 134 does not wait for the data, because the application does not provide any data to the operating system interface shell 134. As a result, the operating system interface shell 134 remains responsive to the user's requests during the transfer of the data object.

Figure 3A:
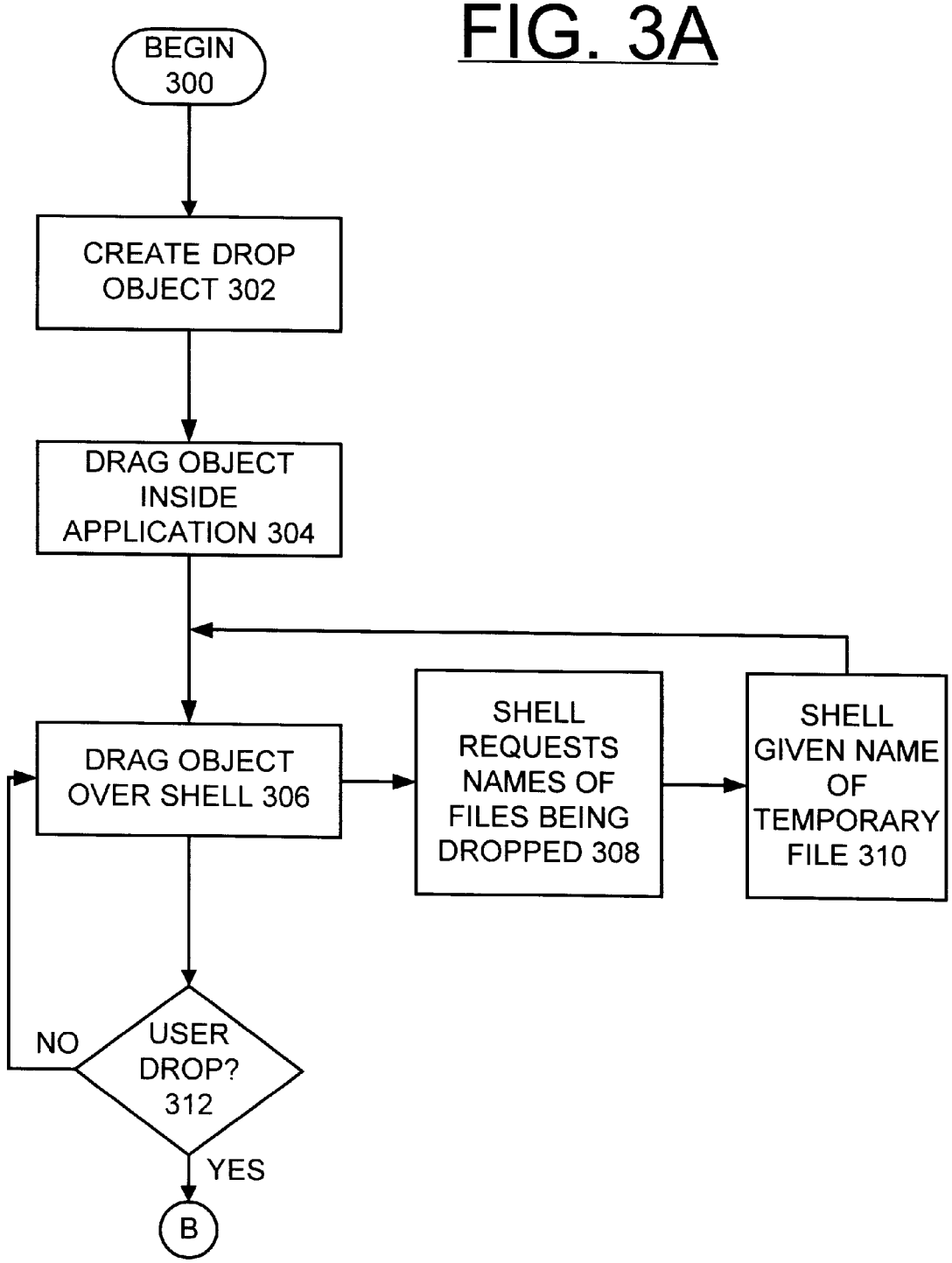
FIGS. 3A and 3B together provide a flow diagram illustrating exemplary steps of the method and computer program product of the preferred embodiment.
Figure 3B:
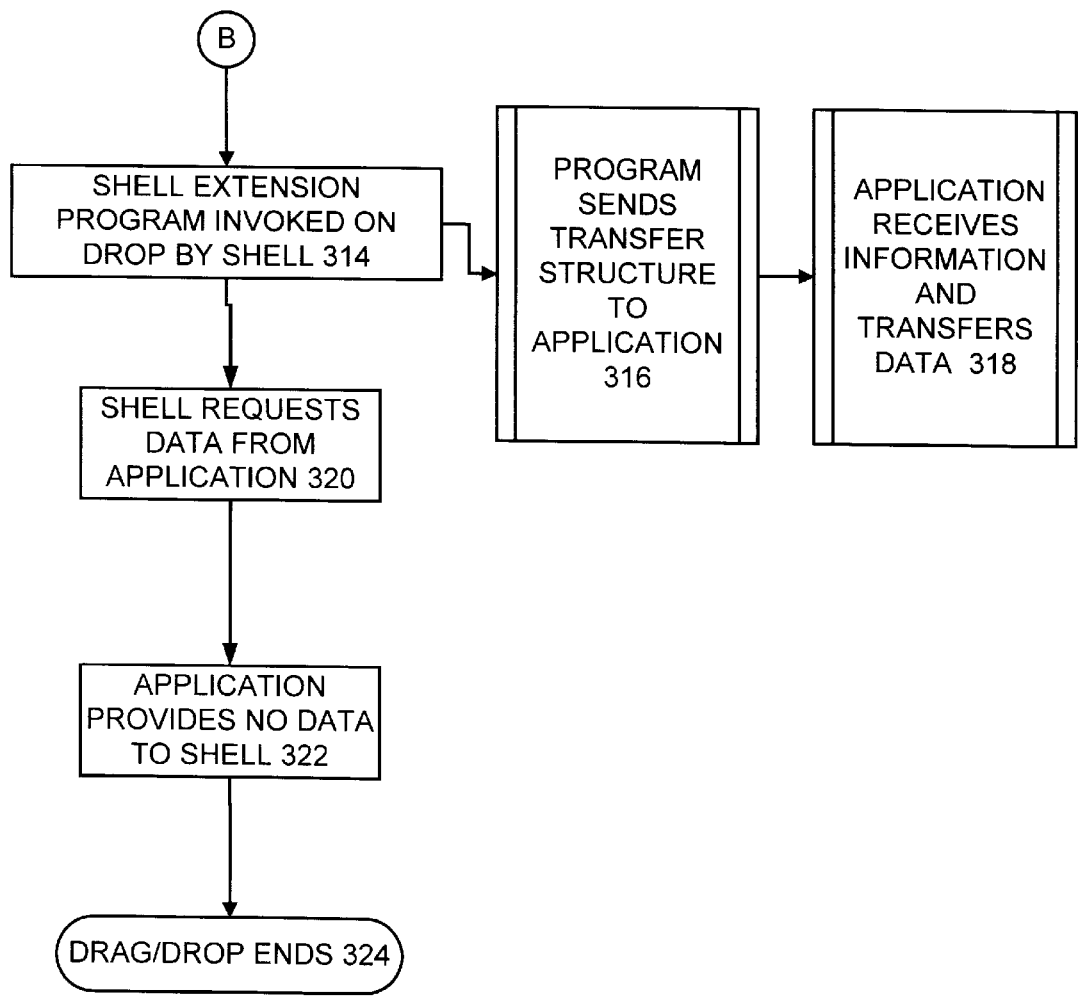

Referring now to FIGS. 3A and 3B, exemplary steps of the method and computer program product of the preferred embodiment are shown starting at a block 300. A drop object is created as indicated at a block 302. Next the object is dragged inside an application as indicated at a block 304. The object is dragged over the operating system interface shell 134 as indicated at a block 306. The operating system interface shell 134 requests the names of the files being dropped as indicated at a block 308. Then the operating system interface shell is given a name of a temporary file as indicated at a block 310. Monitoring for a user drop of the object dragged over the operating system interface shell 134 is performed as indicated at a decision block 312.

Figure 7:
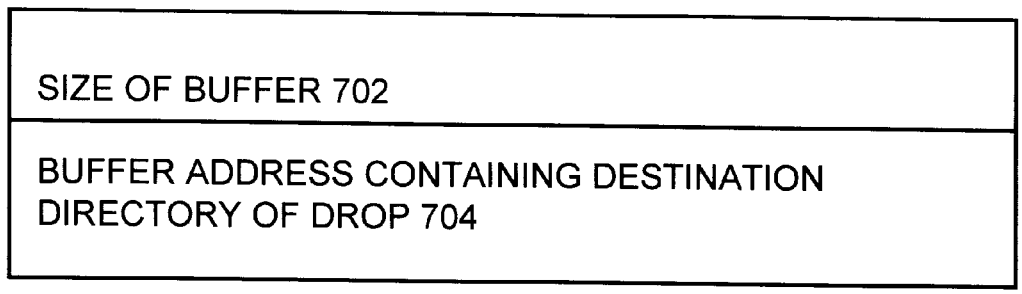

Referring to FIG. 3B, when a user drop is identified at decision block 312, the special shell extension program 132 is invoked by the operating system interface shell 134 as indicated at a block 314. The special shell extension program 132 performs a routine for sending a transfer structure 700 to the application as indicated at a block 316. The transfer structure 700 is illustrated in FIG. 7. The application receives the transfer structure 700 and performs a transfer data routine as indicated at a block 318. The operating system interface shell 134 requests data from the application as typically done as indicated at a block 320. The application provides no data to the operating system interface shell 134. This completes the drag/drop operation as indicated at a block 324.

Figure 4:
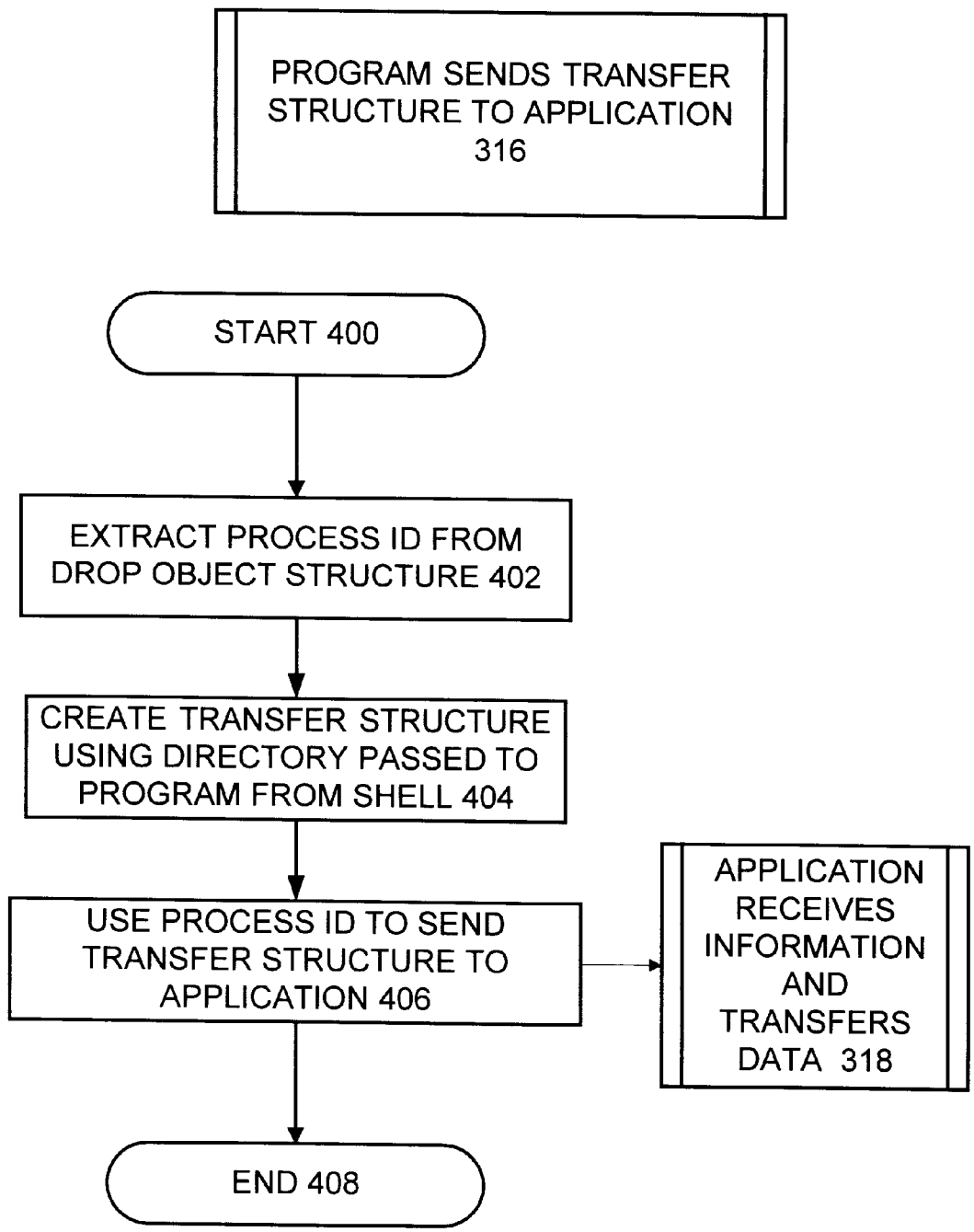
FIG. 4 is a flow diagram illustrating exemplary steps for a program sending transfer structure to an application in accordance with the preferred embodiment.
Figure 6:
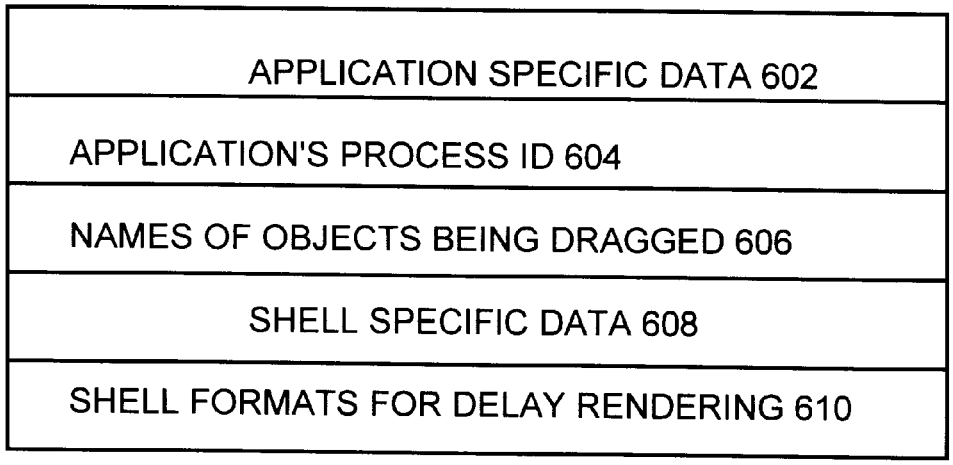
FIGS. 6 and 7 respectively illustrate a drop object structure and a transfer structure of the preferred embodiment.

Referring now to FIG. 4, sequential steps performed by the special shell extension program 132 for sending a transfer structure 700 to the application at block 316 are shown starting at a block 400. A process ID is extracted from a drop object structure 600 as indicated at a block 402. The drop object structure 600 is illustrated in FIG. 6. The special shell extension program 132 creates the transfer structure 700 using the directory passed to the program 132 from the operating system interface shell 134 as indicated at a block 404. The process ID is used to send the transfer structure 700 to the application as indicated at a block 406. This completes the routine for sending the transfer structure as indicated at a block 408. As indicated at a block 318, the application receives the transfer structure 700 and performs a transfer data routine.

Figure 5:
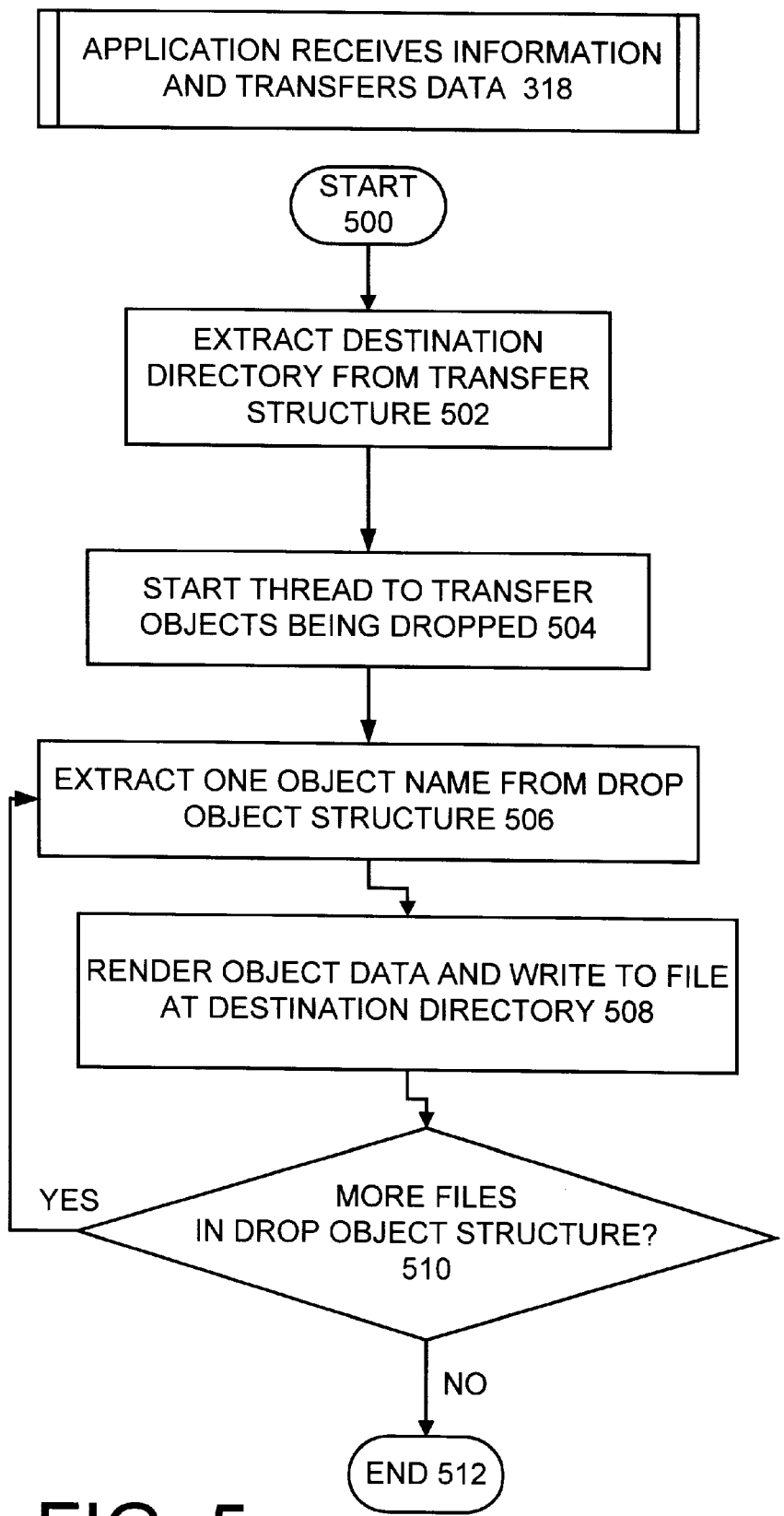
FIG. 5 is a flow diagram illustrating exemplary steps for an application receiving information and transferring data in accordance with the preferred embodiment.

Referring now to FIG. 5, sequential steps performed BY the application receiving the transfer structure 700 and transferring data are shown starting at a block 500. First the destination directory is extracted from the transfer structure as indicated at a block 502. A thread is started to transfer objects being dragged as indicated at a block 504. One object name from the drop object structure is extracted as indicated at a block 506. Then the object data is rendered and written to file at the destination directory as indicated at a block 508. Checking for more files in the drop object structure is performed as indicated at a decision block 510. Then the sequential operations continue returning to blocks 506 and 508, until no more files are left in the drop object structure. This completes the transfer data sequence as indicated at a block 512.

Referring to FIG. 6, the drop object structure 600 is shown. The drop object structure 600 includes application specific data 602 including application's process ID 606 and names of objects being dragged 606; and shell specific data 608 including shell formats for delay rendering 610.

Referring to FIG. 7, the transfer structure 700 is shown. The transfer structure 700 includes a size of buffer 702 and a buffer address containing the destination directory of the drop 704.

Figure 8:
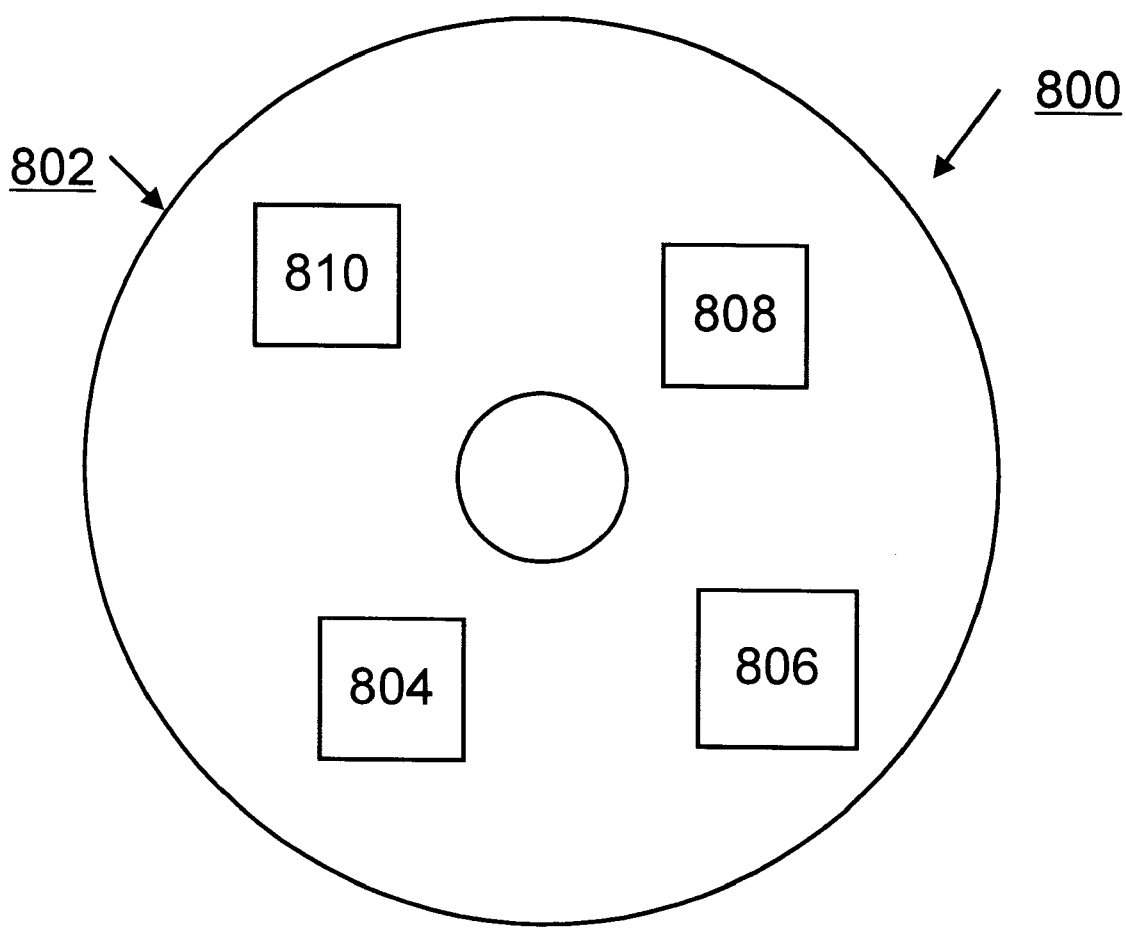
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 806, 804, 808, 810 on the medium 802 for carrying out the methods for implementing simultaneous drag and drop operations for large objects without blocking the operating system interface of the preferred embodiment in the system 100 of FIG. 1.

A sequence of program instructions or a logical assembly of one or more interrelated modules defined by the recorded program means 806, 804, 808, 810, direct the computer system 100 for implementing simultaneous drag and drop operations for large objects without blocking the operating system interface of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing drag and drop operations for large objects without blocking an operating system interface of the computer system comprising the steps of:

identifying a drop operation by an application utilizing an operating system interface shell;

responsive to said identified drop operation, invoking a special shell extension program;

creating a transfer structure including a destination directory and sending said transfer structure to the application utilizing said special shell extension program; and responsive to the application receiving said transfer structure, said application transferring the data object to said destination directory bypassing said operating system interface shell.

2. A computer-implemented method for implementing drag and drop operations for large objects without blocking an operating system interface of the computer system as recited in claim 1 wherein the step responsive to said identified drop operation, of sending said transfer structure to the application utilizing said special shell extension program, includes the steps of extracting a process identification of the application from a predefined drop object structure, and using said process identification to send said transfer structure to the application.

3. A computer-implemented method for implementing drag and drop operations for large objects without blocking an operating system interface of the computer system as recited in claim 2 wherein said drop object structure further includes an object name of each object being dragged.

4. A computer-implemented method for implementing drag and drop operations for large objects without blocking an operating system interface of the computer system as recited in claim 3 wherein the step responsive to the application receiving said transfer structure, of said application transferring the data object to said destination directory includes the steps for each file in said drop object structure, extracting an object name from said drop object structure, rendering and writing the object data to said destination directory.

5. A computer-implemented method for implementing drag and drop operations for large objects without blocking an operating system interface of the computer system as recited in claim 1 wherein the step of identifying a drop operation by an application utilizing said operating system interface shell includes the steps of identifying an object dragged over said operating system interface shell, requesting names of files being dropped and receiving a name of a temporary file.

6. A computer-implemented method for implementing drag and drop operations for large objects without blocking an operating system interface of the computer system as recited in claim 1 wherein the step of sending said transfer structure to the application utilizing said special shell extension program utilizes a process identification extracted from a drop object structure to send said transfer structure to the application.

7. A computer program product for implementing drag and drop operations for large objects without blocking an operating system interface of the computer system, said computer program product including a plurality of computer executable instructions stored on a computer readable medium, wherein said instructions, when executed by said computer, cause the computer to perform the steps of:

identifying a drop operation by an application utilizing an operating system interface shell;

responsive to said identified drop operation invoking a special shell extension program;

creating a transfer structure including a destination directory and sending said transfer structure to the application utilizing said special shell extension program; and responsive to the application receiving said transfer structure, said application transferring the data object to said destination directory bypassing said operating system interface shell.

8. A computer program product for implementing drag and drop operations for large objects without blocking an operating system interface of the computer system, as recited in claim 7 wherein said instructions, when executed by said computer, further cause the computer to perform the steps of extracting a process identification of the application from a predefined drop object structure, and using said process identification to send said transfer structure to the application.

9. A computer program product for implementing drag and drop operations for large objects without blocking an operating system interface of the computer system, as recited in claim 7 wherein said instructions, when executed by said computer, further cause the computer to perform the steps of creating said transfer structure using said destination directory obtained from said operating system interface shell.

10. A computer program product for implementing drag and drop operations for large objects without blocking an operating system interface of the computer system, as recited in claim 7 wherein said instructions, when executed by said computer, further cause the computer to perform the steps, for each file in said drop object structure, of extracting an object name from said drop object structure, rendering and writing the object data to said destination directory.

* * * * *